United States Patent [19]

Whaley

[11] 4,395,185
[45] Jul. 26, 1983

[54] SELF-LEVELING BOAT TRAILER

[76] Inventor: Morris L. Whaley, Star Rte. (Moss Lake), Gainesville, Tex. 76240

[21] Appl. No.: 359,516

[22] Filed: Mar. 18, 1982

Related U.S. Application Data

[63] Continuation-in-part of Ser. No. 288,544, Jul. 30, 1981, abandoned.

[51] Int. Cl.³ .............................. B60P 1/28; B60P 3/10
[52] U.S. Cl. .................................... 414/483; 114/344; 280/414.1
[58] Field of Search .......................... 280/414.1, 414.3; 114/344; 414/482, 483

[56] References Cited
U.S. PATENT DOCUMENTS

| | | | |
|---|---|---|---|
| 3,004,771 | 10/1961 | Moore, Jr. | 114/344 |
| 3,365,733 | 1/1968 | Gudmundson | 114/344 |
| 4,099,279 | 7/1978 | Park | 414/482 |

Primary Examiner—Joseph F. Peters, Jr.
Assistant Examiner—Donn McGiehan
Attorney, Agent, or Firm—Hubbard, Thurman, Turner & Tucker

[57] ABSTRACT

A self-leveling boat trailer adapted to be towed behind a vehicle. In one embodiment, the trailer includes a pivotally mounted tongue assembly and a wheeled undercarriage. A flotation system at the stern end of the trailer causes the stern of the trailer to float upon entry into the water. A control linkage is utilized to pivot the tongue assembly in response to the flotation of the trailer stern, lowering the bow end of the trailer, thereby maintaining the trailer in a level position. In a second embodiment, the entire support platform pivots while the tongue assembly and wheeled undercarriage are coupled to a single rigid member. In either embodiment, boat launch and recovery are improved by maintaining the trailer in a level position despite the incline of a typical launching ramp.

11 Claims, 6 Drawing Figures

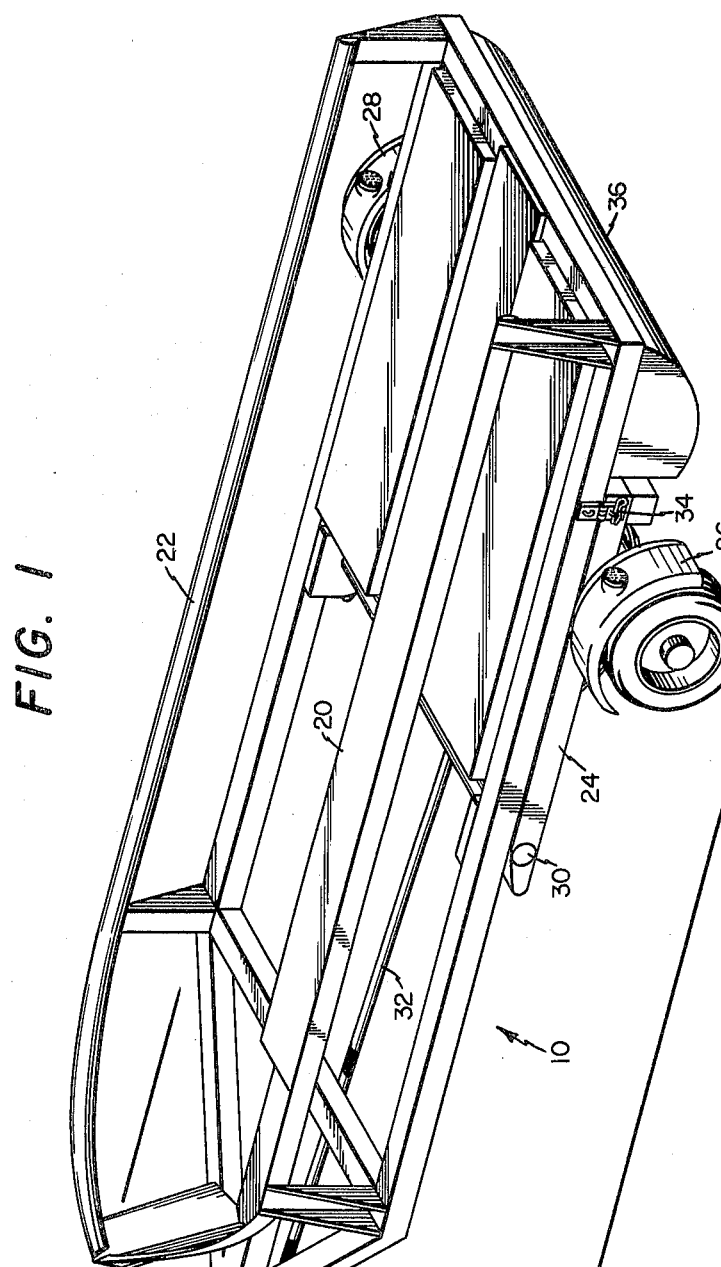
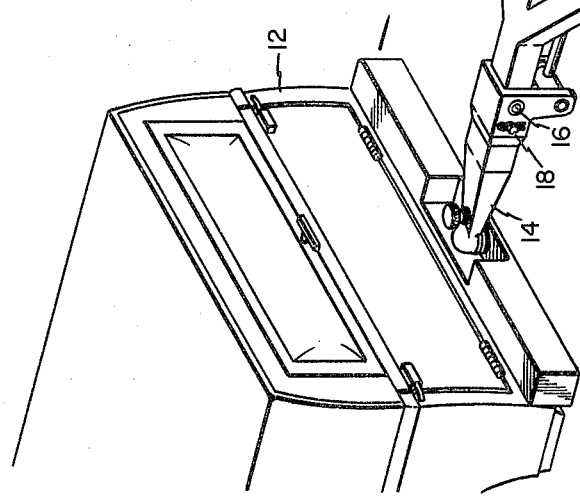
FIG. 1

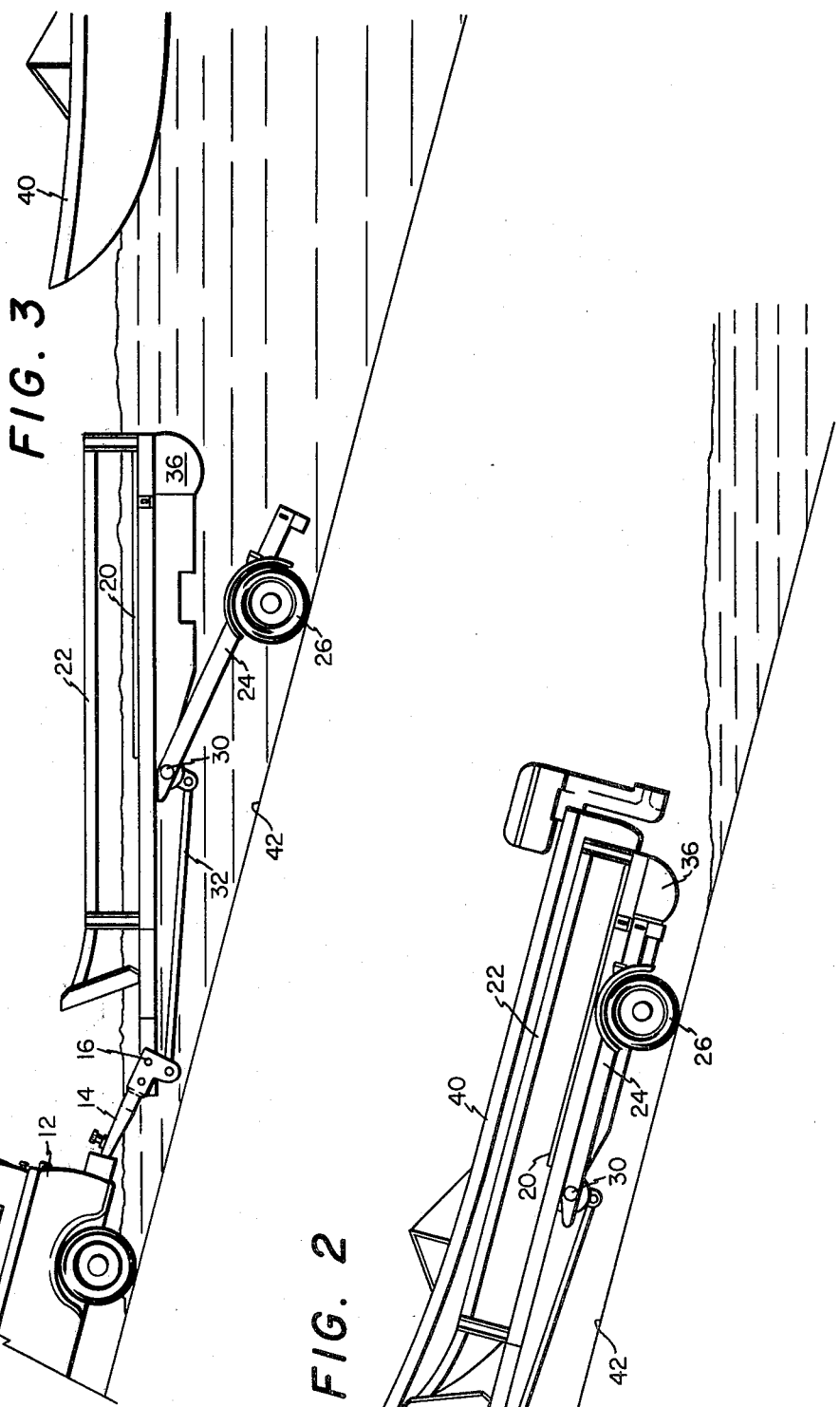

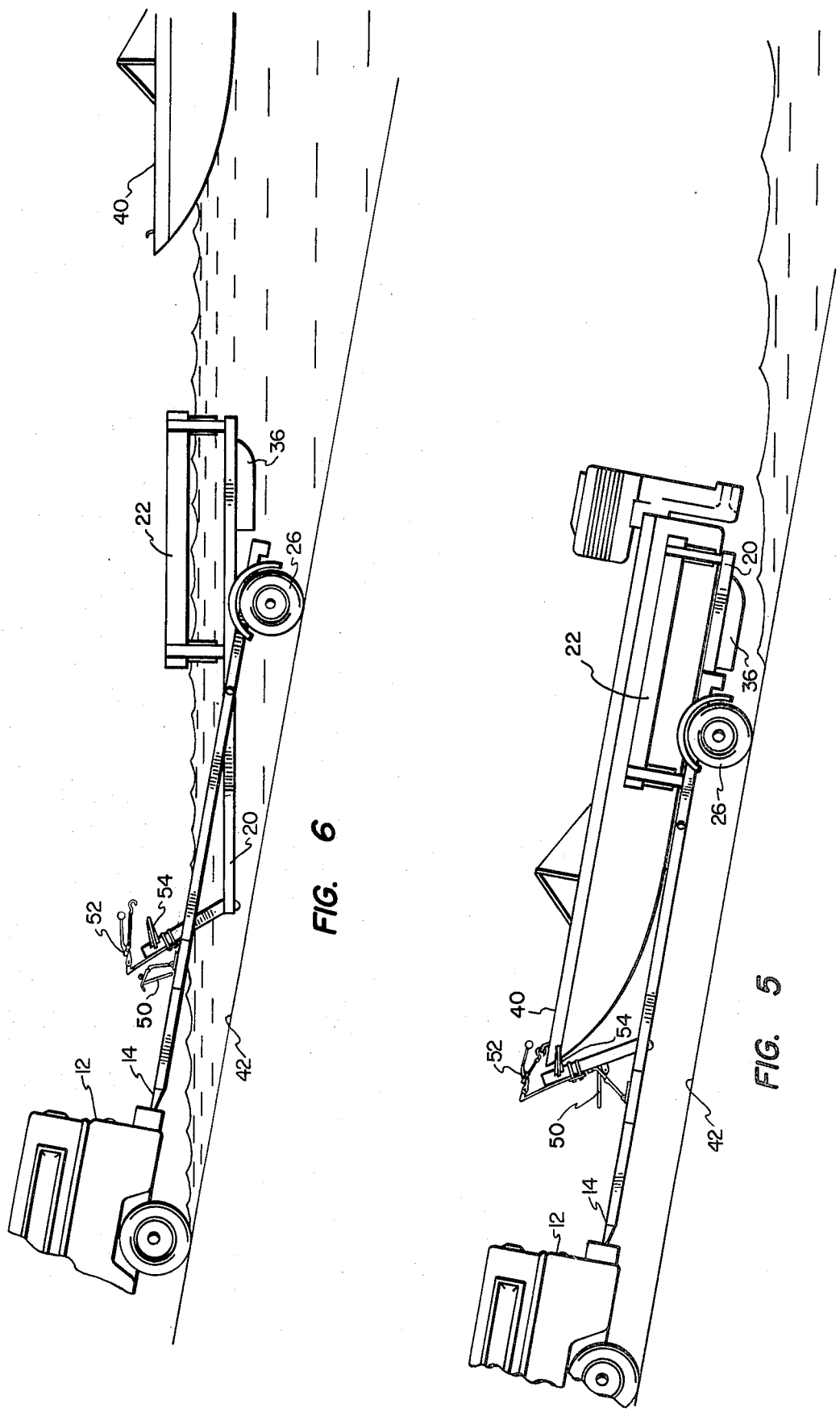

SELF-LEVELING BOAT TRAILER

This is a continuation-in-part of application Ser. No. 288,544 filed July 30, 1981, now abandoned.

BACKGROUND OF THE INVENTION

This invention relates to boat trailers in general and more particularly to boat trailers having means for maintaining a level position during launch and recovery of a boat.

Prior art boat trailers are typically rigidly mounted structures which are backed into a body of water by means of an incline or launching ramp. As the gradient of the incline steepens, the stern of a boat will float, and the boat may be launched by pulling the bow off the trailer, by hand or by motor.

Similarly, during recovery, the bow of the boat must be driven up onto the raised front of the trailer, and then the trailer is withdrawn from the water, hopefully causing the stern of the boat to settle in place.

Such known boat trailers are likely to cause damage to boat hulls either by forcibly withdrawing the bow while the stern is afloat, or by the boat hull settling unevenly into the trailer as the trailer is withdrawn from the water.

SUMMARY OF THE INVENTION

Accordingly, it is an object of the present invention to provide an improved boat trailer.

It is another object of the present invention to provide a boat trailer that permits accurate placement of a boat upon a trailer during recovery.

It is yet another object of the present invention to provide a boat trailer which remains level while immersed in water on an incline.

The foregoing objects are achieved as is now described. In one embodiment, the trailer includes a pivotally mounted tongue assembly and a wheeled undercarriage. A flotation system at the stern end of the trailer will cause the stern of the trailer to float upon immersion into water. A control linkage is utilized to pivot the tongue assembly, in response to the flotation of the trailer stern, thus lowering the bow end of the trailer, thereby maintaining the trailer in a level position. In a second embodiment, the entire support platform pivots while the tongue assembly and wheeled undercarriage are coupled to a single rigid member. In either embodiment, boat launch and recovery are improved by maintaining the trailer in a level position despite the incline of a typical launching ramp.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

FIG. 1 depicts a perspective view of a first embodiment of the self-leveling boat trailer of the present invention;

FIG. 2 depicts a side view of a first embodiment of the self-leveling boat trailer of the present invention in the pre-launch position;

FIG. 3 depicts a side view of a first embodiment of the self-leveling boat trailer of the present invention in the post-launch, pre-recovery position;

FIG. 5 depicts a side view of a second embodiment of the self-launching boat trailer of the present invention in the pre-launch position;

FIG. 6 depicts a side view of a second embodiment of the self-leveling boat trailer of the present invention in the post-launch, pre-recovery position.

DETAILED DESCRIPTION OF THE INVENTION

Figure 4:
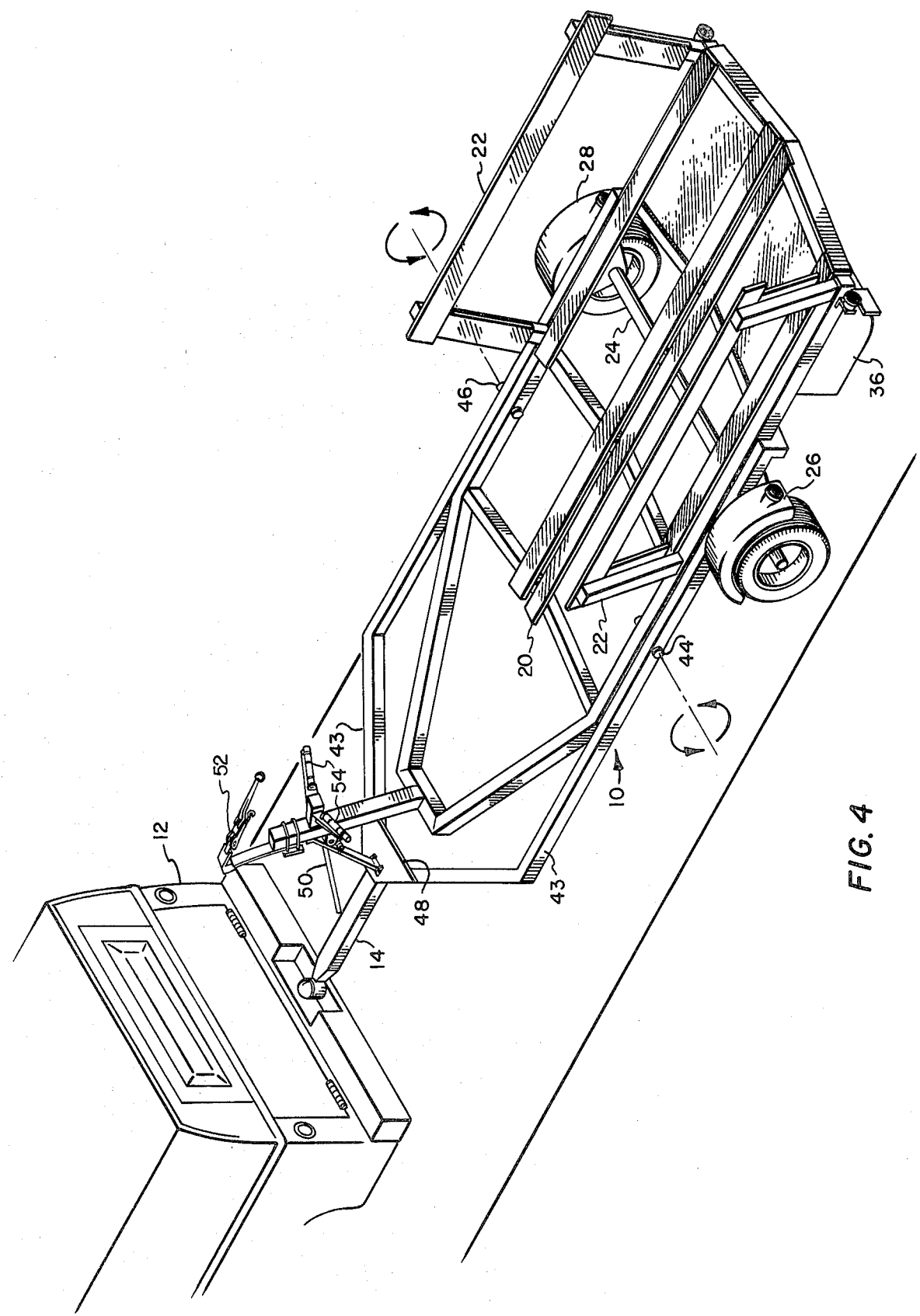
FIG. 4 depicts a perspective view of a second embodiment of the self-leveling boat trailer of the present invention.

Referring now to the figures in general and to FIG. 1 in particular, there is depicted a perspective view of the first embodiment of the self-leveling boat trailer of the present invention.

Trailer 10 is depicted as coupled to a vehicle 12 by means of tongue assembly 14. Tongue assembly 14 is pivotally mounted to the trailer at point 16; however, tongue assembly 14 may be locked in place by means of locking pin 18.

Trailer 10 consists of a support platform 20 and guide rail 22. Those skilled in the art will appreciate that support platform 20 is obviously designed for utilization with a relatively flat bottomed boat; however, minor design alterations which are well within the scope of the present invention may be utilized to allow the boat trailer of the present invention to accommodate V-type hulls, catamaran hulls or trimaran hulls.

Trailer 10 also includes a wheeled undercarriage 24 with wheels 26 and 28. Undercarriage 24 is pivotally mounted about point 30, and is rigidly coupled to tongue assembly 14 by means of control linkage 32. As a matter of design choice, locking device 34 may also be utilized to prevent pivoting of undercarriage 24 during transport.

Flotation device 36 is mounted to the stern end of trailer 10 and is utilized to maintain the level position of trailer 10 in a manner which will be explained in detail below. Again, as a matter of simple design choice, flotation device 36 may be comprised of a mass of buoyant material which is fixedly mounted to trailer 10, or may comprise a void space within the structure of support platform 20, or buoyant material which itself comprises support platform 20. Flotation device 36 should be of sufficient buoyance to impart a slight positive buoyancy to the stern end of the trailer.

Referring now to FIG. 2, there is depicted a side view of a first embodiment of the self-leveling boat trailer of the present invention, in the pre-launch position. Trailer 10 and boat 40 are placed upon a launch ramp or incline 42. Locking pin 18 and locking device 34, if utilized, are released, thus permitting free pivoting of both tongue assembly 14 and undercarriage 24. Vehicle 12 is then utilized to back trailer 10 into the water, in the manner well known in the art.

With reference now to FIG. 3, there is depicted the first embodiment of the self-leveling boat trailer of the present invention in the post-launch, pre-recovery position. As depicted, flotation device 36, once immersed in water, is effective to float the stern end of trailer 10. As the stern of trailer 10 is floated by flotation device 36, wheeled undercarriage 24 will pivot away from support platform 20 about point 30.

Control linkage 32 is fixedly mounted at one end to undercarriage 24, and is thrust forward by the pivoting action of undercarriage 24. The other end of control linkage 32 is fixedly mounted to tongue assembly 14, and, in response to the pivoting action of undercarriage 24, will cause tongue assembly 14 to pivot, effectively lowering the bow section of trailer 10.

In the position depicted in FIG. 3, it should be apparent that a boat may be launched or recovered without possible hull damage. During launch, the entire boat will be afloat, thus preventing damage while backing out of trailer 10. During recovery, guide rail 22 is utilized to ensure that boat 40 is properly positioned about the center line of support platform 20. If the amount of water above support platform 20 is slightly shallower than the draft of boat 40, the fact that only slight positive buoyancy is provided by flotation device 36 will ensure that recovery of boat 40 may be easily achieved.

Referring now to FIG. 4, there is depicted a perspective view of a second embodiment of the self-leveling boat trailer of the present invention. Similar elements of this second embodiment are depicted utilizing the reference numerals utilized in the previous figures.

Trailer 10 is depicted as coupled to vehicle 12 by means of tongue assembly 14. Tongue assembly 14 is rigidly coupled to frame 43. Frame 43 serves to provide a mounting point for wheeled undercarriage 24 and wheels 26 and 28. Wheeled undercarriage 24 serves to space the members of frame 43 which also supports pivot assemblies 44 and 46.

Pivot assemblies 44 and 46 on frame 43 are utilized to pivotally mount support platform 20 and guide rails 22. Those skilled in the art will appreciate that as with the first embodiment of the present invention, support platform 20 is obviously designed for utilization with a relatively flatbottomed boat; however, minor design alterations which are well within the scope of the present invention may be utilized to allow the boat trailer of the present invention to accommodate V-type hulls, catamaran or trimaran hulls.

Support platform 20 is restrained from pivoting upward beyond a point level with frame 43 by latch 50 which serves to immobilize support platform 20 during transport. Those skilled in the art will appreciate that latch 52 and rollers 54 serve to rigidly mount the bow of a boat during transport on trailer 10.

Support platform 20 also includes, as in the first embodiment of the present invention, flotation device 36, which is mounted in the stern end of support platform 20 and is utilized to maintain the level position of trailer 10 in the manner which will be explained in detail below. As before, as a matter of design choice, flotation device 36 may be comprised of a mass of buoyant material fixedly mounted to support platform 20, or may comprise a void space within the structure of support platform 20.

Referring now to FIG. 5, there is depicted a side view of a second embodiment of the self-leveling boat trailer of the present invention, in the pre-launch position. Trailer 10 and boat 40 are placed upon a launch ramp or incline 42. Vehicle 12 is then utilized to back trailer 10 into the water. Latch 50 is utilized in the depicted embodiment to restrain platform 20 in the transport position depicted and must be released prior to the launching of boat 40.

Referring now to FIG. 6, there is depicted a side view of the second embodiment of the self-leveling boat trailer of the present invention in the post-launch, pre-recovery position. In the depicted embodiment, flotation device 36 has caused the stern end of support platform 20 to float, pivoting support platform 20 about pivot assemblies 44 and 46, and lowering the bow section of support platform 20. In the position depicted in FIG. 6, it should again be apparent to those skilled in the art that boat 40 may be launched or recovered with a minimum of possible hull damage due to the level position of support platform 20.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A self-leveling boat trailer comprising:
 a support platform adapted to receive the hull of a boat, said support platform including a wheeled undercarriage and means for coupling a first end of said support platform to a vehicle;
 flotation means disposed at a second end of said support platform for causing said second end of said support platform to float upon immersion into water; and
 means for lowering said first end of said support platform in response to the flotation of said second end whereby said support platform is maintained in a level position.

2. The self-leveling boat trailer according to claim 1, wherein said support platform includes railings for surroundingly engaging the hull of a boat.

3. The self-leveling boat trailer according to claim 1, wherein said flotation means comprises a mass of buoyant material mounted to said second end of said support platform.

4. A self-leveling boat trailer comprising:
 a support platform adapted to receive the hull of a boat;
 a tongue assembly, pivotally mounted to a first end of said support platform and adapted to be coupled to a vehicle;
 a wheeled undercarriage, pivotally mounted to said support platform;
 flotation means disposed at a second end of said support platform of sufficient buoyancy to cause said second end of said support platform to float upon immersion into water; and
 means for pivoting said tongue assembly in response to the flotation of said second end of said support platform whereby said first end is lowered and said support platform is maintained in a level position.

5. The self-leveling boat trailer according to claim 4, wherein said support platform includes railings for surroundingly engaging the hull of a boat.

6. The self-leveling boat trailer according to claim 4, wherein said tongue assembly includes a locking pin for selectively preventing pivoting.

7. The self-leveling boat trailer according to claim 4, wherein said flotation means comprises a mass of buoyant material mounted to said second end of said support platform.

8. The self-leveling boat trailer according to claim 4, wherein said pivoting means comprises a fixed link between said wheeled undercarriage and said tongue assembly.

9. A self-leveling boat trailer comprising:
a support platform having a bow end and a stern end and adapted to receive the hull of a boat;
a frame including a tongue assembly adapted to be coupled to a vehicle and having at least one pivoting mounting point adapted to receive and pivotally mount said support platform at a selected point intermediate said bow end and said stern end; and
flotation means disposed at the stern end of the support platform of sufficient buoyancy to cause said stern end of said support platform to pivot upward and float upon immersion into water and said bow end to pivot downward in response to said flotation of said stern end whereby said support platform is maintained in a level position.

10. The self-leveling boat trailer according to claim 9, wherein said support platform includes railings for surroundingly engaging the hull of a boat.

11. The self-leveling boat trailer according to claim 9, wherein said flotation means comprises a mass of buoyant material mounted to said second end of said support platform.

* * * * *